Aug. 6, 1929. E. WIGLENDA 1,723,106
DEVICE FOR CUTTING OUT PLATED WORK PIECES
Filed Feb. 4, 1927
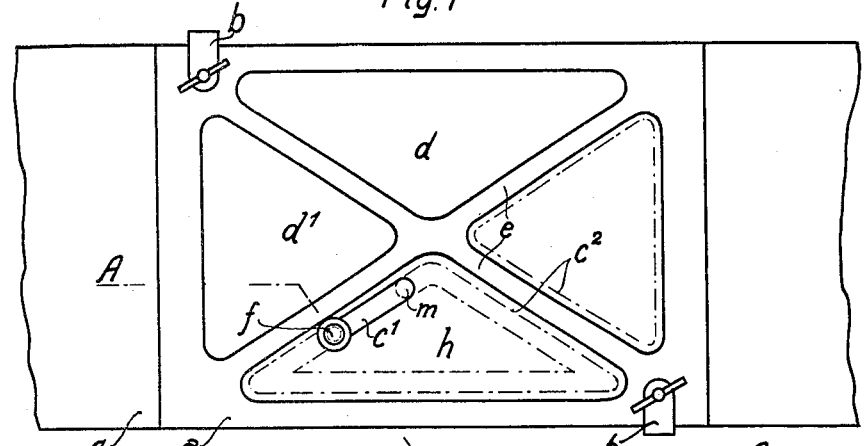
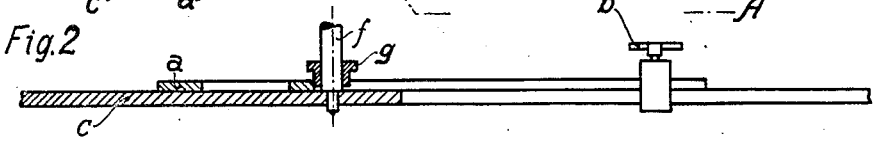
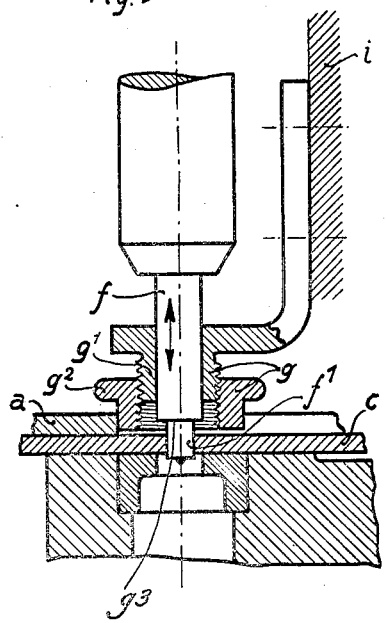
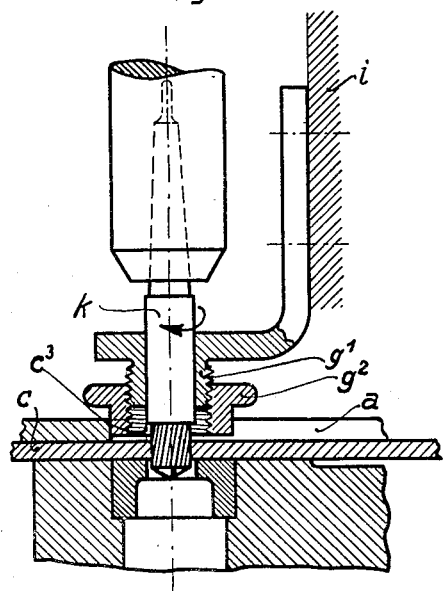
INVENTOR
ERNST WIGLENDA,
BY Eyre Scott & Keel
ATTORNEYS Patented Aug. 6, 1929.

1,723,106

UNITED STATES PATENT OFFICE.

ERNST WIGLENDA, OF SPANDAU, GERMANY, ASSIGNOR TO THE FIRM: ROHRBACH METALL-FLUGZEUGBAU G. M. B. H., OF BERLIN, GERMANY.

DEVICE FOR CUTTING OUT PLATED WORK PIECES.

Application filed February 4, 1927, Serial No. 165,824, and in Germany January 9, 1926.

The invention relates to the forming of plated work pieces with the aid of templets which are fastened on the work pieces and are moved along a forming tool, and the object of the invention is a special milling and punching apparatus capable of forming work pieces with an unlimited range of curvatures from straight edges to very small curvatures, and also capable of practical use with templets of small depth and light cheap material such as wood. The invention also contemplates a special apparatus of this character whereby the forming operations may be effected with great facility, even with unskilled labor.

More particularly the invention includes the provision of an arcuate guide member disposed between the forming tool and the templet whose bearing surface is concentric with the axis of the tool so that all points of the bearing surface are located at equal short distances from the tool, which for this reason can penetrate into small angles of the templet. In the preferred embodiment the arcuate member is of circular form whereby the whole circumference can serve as a bearing and guiding surface. In cutting figures of any kind the work piece need be only shifted and not swiveled. The templet slides along the guiding piece, the latter being non-rotatably and non-swivelly mounted, and the arcuate guide piece, while bearing against the templet guiding edge, ordinarily stops short of the work piece, the latter being firmly held against the templet. In employing this special construction usable from all sides, no special skill is required in the forming operations.

An especially advantageous construction results when the guiding member is composed of two parts so that on an interior fixed member the other member is arranged which has the arcuate bearing surface and is axially adjustable thereon, preferably screwable. The labourer can easily and correctly adjust the guiding member and tool with the greatest facility.

Preferably the tool is also provided with a co-axial appendix which as a feed regulator co-operates with the circular tool guide member to facilitate the operations.

The accompanying drawings show embodiments of the subject matter of this invention, by way of example.

Fig. 1 is a plan view of a templet with work-piece attached thereunder.

Fig. 2 represents a section on line A—A of Fig. 1.

Fig. 3 shows part of a punching machine, and Fig. 4 part of a milling machine embodying the invention.

$a$ is a templet attached by means of screw clamps $b$ to a plate $c$ (a duralumin plate, for instance), said templet being provided with four holes $d$, $d^1$, each symmetrical pair of which embrace between them a diagonal cross arranged in a rectangle. $f$ is a tool (a punching arbor, for instance), moving up and down in an axially adjustable arcuate guide $g$, arranged above the work-piece, its outer contour being cylindrical and concentric to the tool axis.

When the templet is moved with the edges of the templet-holes $d$, $d^1$ guided along the cylindrical guiding member $g$, the arbor $f$ punches an endless, retrograding groove $c^1$ out of the plate $c$, thus separating and causing a full part or cutting $h$ to fall off the plate $c$.

As soon as all four cuttings are punched out of said plate, the remaining diagonals $c^2$ will be of greater width than the diagonals $e$ of the templet by the difference in diameter of the members $f$ and $g$. This means that the holes $d$, $d^1$ of the templet must be of accordingly larger dimensions than the holes formed in the work-piece.

The cylindrical guide, arranged concentric to the tool axis, has the advantage that during the cutting process the work-piece has only to be so shifted that the troublesome and often impracticable swinging or swivelling is avoided.

In Fig. 3 the working part of a punching machine embodying the invention is represented. $f$ is another arbor or punching tool of cylindrical cross section at the cutting end, provided at its lower end with an appendix $f^1$ of smaller diameter arranged concentric to the arbor axis and having the circular cutting edge $g^3$. This appendix serves as a feed regulator and projects into the groove $c^1$ at all times with the machine operating.

The guide $g$ (in this embodiment) consists of two concentric relatively adjustable parts.

The inner part $g^1$ serves as guide for the arbor $f$ and is rigidly fixed to a stationary part $i$ of the machine. The outer part $g^2$ is cylindrical and designed as a nut like member, and in order to receive the work-piece $c$, is axially screwed on to the externally threaded part $g$. This outer part serves to guide the templet and, at the same time, to automatically strip the work-plate off the reciprocating arbor $f$.

Fig. 4 shows a machine with milling device $k$, i. e., with a rotary cutting tool $c^3$. The guide $g$ is similar in construction and operation to that described in Fig. 3.

The operation of the form of construction in Fig. 3 is as follows. The part $g^2$ is screwed or adjusted upwardly on the part $g^1$ and the work-piece $c$ and templet $a$ are then introduced underneath the arbor $f$, $f^1$, whereupon the part $g^2$ is adjusted to its operative position just above the work-piece $c$ and projecting into the templet opening $d$ or $d^1$. The edge of the templet opening is then caused to engage the guide $g^2$ and the machine set in operation. The descending arbor $f$ punches, with normal working conditions, a falcate chip, the greatest breadth of which corresponds to the feed, regulated by the appendix $f^1$.

It is advisable, for the first punching stroke, to rough drill either a hole $m$ of the size of the appendix $f^1$, or the arbor $f$, or to directly make said hole by means of $f^1$.

In the embodiment of Fig. 4 the feed corresponds to the detachment of a chip. The point of the milling device $k$ can be designed as a drill point in order to facilitate the making of the introduction-hole, by the tool itself.

Under certain circumstances, with comparatively soft work-pieces, for instance, it is possible and a well known practice to use the tool itself as templet guide.

The dotted edge line in Fig. 4 indicates a templet, being directly adjacent to the thicker and more massive shaft of the milling device. The nut guide $g^2$ is then screwed or adjusted upwardly to permit the introduction of the work-piece together with the attached templet $a$ underneath the same, thus indirectly supporting the work-piece against the part $g^2$.

The same applies to the device according to Fig. 3, wherein, after having sufficiently elevated the nut $g^2$, the templet can be directly guided by the arbor $f$. It is, of course understood that said arbor does not protrude from the templet groove during the upper stroke reversal.

The practice of having the templet guided directly by the work piece facilitates the cutting out of small angles or the use of templets with holes of equal size as the cuttings to be made but it is not often followed.

The arrangement of a one piece or subdivided cylindrical guide $g$, according to the forms of construction shown in the above examples, possesses the combined advantages of correct and accurate tool-guide with easy introduction of the work piece and with all-round accessibility of the templet with regard to its guide, the latter serving, at the same time, as a stripping device.

What I claim is:

1. In an apparatus for forming plate work pieces by aid of templets attached thereto, the combination of a working tool and a templet guiding member of arcuate form having a cylindrical bearing surface concentric with the longitudinal axis of the tool, said arcuate guide member being axially adjustable with reference to the tool but normally fixed and functioning as a guide member for both the templet and the working tool.

2. In an apparatus for forming plate work pieces by aid of templets attached thereto, the combination of a working tool and a templet guiding member of arcuate form having a cylindrical bearing surface concentric with the longitudinal axis of the tool and adapted to space the templet from the tool and to guide the former during the forming operations, said guide member consisting of a fixed support and a guiding part axially adjustable thereupon.

3. An apparatus of the character set forth in claim 2 wherein the guiding member consists of a fixed inner supporting part for guiding the working tool and an outer ring part for guiding the templet, the outer part being axially adjustable about the inner part.

4. An apparatus of the character set forth in claim 2 wherein the bottom edge of the fixed supporting part of the adjustable guide member is arranged at a distance of at least the templet depth from the surface of the work piece and the adjustable part is adjustable to a distance at least equal to said depth.

5. An apparatus of the character set forth in claim 2 wherein the working tool is a punching tool and has a solid appendix protruding from its bottom end and serving as a feed regulator.

6. In an apparatus for forming plate work pieces by aid of templets attached thereto, the combination of a working tool and a templet guiding member of arcuate form having a cylindrical bearing surface concentric with the longitudinal axis of the tool and adapted to space the templet from the tool and to guide the former during the forming operations, the arcuate guiding member being axially adjustable with reference to the tool and functioning to both guide the templet and to slip the work piece from the tool.

7. In an apparatus for forming plate work pieces by aid of templets attached thereto, the combination of a working tool of cylindrical cross-section and a templet guiding member adapted to space the templet from the tool and to guide the former during the forming operation; said guiding member being normally in fixed position and having a cylindrical guiding surface concentric with the longitudinal axis of the tool and adapted to be engaged by the templet, the working tool being a punching tool provided with a circular cutting edge on its cutting end, and a solid appendix of smaller diameter protruding therefrom, said appendix being coaxial with the axis of the punch tool and adapted to serve as a feed regulator.

8. In an apparatus for forming plate work pieces by aid of templets attached thereto, the combination of a punching tool of cylindrical cross-section and a normally fixed templet guiding member adapted to space the templet from the tool and to guide the former during the forming operation, said guiding member having a cylindrical guiding surface concentric with the longitudinal axis of the tool, said tool having a circular cutting edge on the cutting end of the tool, and a solid appendix of smaller diameter protruding from the lower end of the tool and being concentric with the cutting edge, the templet guiding member being adjustable axially of the punching tool.

9. In an apparatus of the character set forth in claim 8, wherein the templet guiding member is divided into two coaxially arranged parts, the inner part being in fixed position and bearing the outer part, the latter being axially adjustable relative to the inner part and adapted to guide the templet.

10. In an apparatus of the character set forth in claim 8, wherein the templet guiding member is divided into two parts concentric with each other and with the longitudinal axis of the punching tool, the inner part being in fixed position, the lower end of said part lying above the templet, the outer part being adapted to guide the templet and screw threadedly connected with the inner part, said outer part being readily adjustable axially on the inner part to a distance at least equal to the depth of the templet.

11. In an apparatus of the character set forth in claim 8, wherein the templet guiding member is divided into two parts concentric with each other and with the longitudinal axis of the punching tool, the inner part being in fixed position, the lower end of said part lying above the templet, the outer part being adapted to guide the templet and screw threadedly connected with the inner part, said outer part carrying a milled head and being readily adjustable axially on the said inner part.

12. In an apparatus for forming plate work pieces by aid of templets attached thereto, the combination of a working tool of cylindrical cross-section and a templet guiding member adapted to space the templet from the tool and to guide the former during the forming operation; said guiding member being normally in fixed position and having a cylindrical guiding surface concentric with the longitudinal axis of the tool and adapted to be engaged by the templet, the templet guiding member also forming a guiding member for the tool.

13. In an apparatus of the character set forth in claim 8, wherein the templet guiding member is divided into two parts coaxially arranged with each other and with the longitudinal axis of the punching tool, the inner part being in fixed position and guiding the tool, the outer part being carried by and axially adjustable on the inner part and adapted to guide the templet and to strip the work piece from the tool.

14. An apparatus of the character set forth in claim 2, wherein the guiding member consists of a fixed inner supporting part and an outer ring part for guiding the templet, the outer part being screw-threadedly connected with and axially adjustable about the inner part.

15. An apparatus of the character set forth in claim 2, wherein the bottom edge of the fixed supporting part of the adjustable templet guiding member is arranged at a distance of at least the templet depth from the surface of the work piece and the adjustable part is adjustable to a distance at least equal to said depth and adapted to slip the work piece from the tool.

16. An apparatus of the character set forth in claim 2, wherein the working tool is a cylindrical punching tool, having a circular cutting edge and a solid appendix of smaller diameter protruding from its cutting end, said appendix being coaxial with the longitudinal axis of the punching tool and serving as a feed regulator.

In testimony whereof, I have signed my name to this specification.

ERNST WIGLENDA.